(12) United States Patent
Maruno et al.

(10) Patent No.: US 7,661,744 B2
(45) Date of Patent: Feb. 16, 2010

(54) ATTACHING STRUCTURE OF SPLIT TYPE SEAT BACK FOR VEHICLE

(75) Inventors: Yuuki Maruno, Shizuoka (JP); Masashi Wada, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 5 days.

(21) Appl. No.: 12/105,675

(22) Filed: Apr. 18, 2008

(65) Prior Publication Data

US 2008/0315609 A1 Dec. 25, 2008

(30) Foreign Application Priority Data

Apr. 20, 2007 (JP) ............... 2007-111153

(51) Int. Cl.
*B60N 2/20* (2006.01)
(52) U.S. Cl. ............... 296/65.16; 296/187.05; 296/193.02
(58) Field of Classification Search ............ 296/187.05, 296/187.08, 193.02, 193.07, 63, 65.05, 65.08, 296/65.09, 65.16, 65.17; 297/216.14, 354.1
See application file for complete search history.

(56) References Cited

U.S. PATENT DOCUMENTS

| | | | | |
|---|---|---|---|---|
| 4,770,459 A | * | 9/1988 | Nakaiwa et al. | 296/68.1 |
| 5,927,808 A | * | 7/1999 | Esker | 297/333 |
| 6,682,120 B2 | * | 1/2004 | Kamida et al. | 296/65.09 |
| 6,688,666 B2 | * | 2/2004 | Neale et al. | 296/65.09 |
| 6,709,040 B1 | * | 3/2004 | Drew et al. | 296/66 |
| 6,988,768 B2 | * | 1/2006 | Kutomi et al. | 297/15 |
| 7,040,685 B2 | * | 5/2006 | Sumida et al. | 296/69 |
| 7,073,823 B2 | * | 7/2006 | Morino et al. | 280/801.1 |
| 7,152,900 B2 | * | 12/2006 | Trombley et al. | 296/65.09 |
| 7,448,674 B2 | * | 11/2008 | Brunner et al. | 296/193.02 |
| 2003/0075946 A1 | * | 4/2003 | Neale et al. | 296/65.09 |
| 2006/0208520 A1 | * | 9/2006 | Trombley et al. | 296/65.09 |
| 2008/0246297 A1 | | 10/2008 | Tietje | |

FOREIGN PATENT DOCUMENTS

DE 10 2006 007 374 8/2007
JP 10-217819 8/1998

OTHER PUBLICATIONS

Office Action issued by the German patent and Trademark Office on Jul. 21, 2009.

* cited by examiner

*Primary Examiner*—Jason S Morrow
(74) *Attorney, Agent, or Firm*—Stein McEwen, LLP (57) ABSTRACT

A pair of seat backs are arranged in a vehicle width direction. A pair of floor brackets attach outer end portions of the seat backs in the vehicle width direction to a floor of the vehicle. A pair of center hinge brackets attach inner end portions of the seat backs in the vehicle width direction to the floor. A supporting bar is separated from the floor, is extended in the vehicle width direction and is disposed behind the seat backs. The seat backs are independently pivotably attached to the floor. Both end portions of the supporting bar in the vehicle width direction are attached to the floor brackets. A center portion of the supporting bar in the vehicle width direction is attached to the center hinge brackets.

5 Claims, 12 Drawing Sheets

FIG. 1

RUNNING DIRECTION OF VEHICLE

LUGGAGE COMPARTMENT SIDE

ATTACHING STRUCTURE OF SPLIT TYPE SEAT BACK FOR VEHICLE

The disclosure of Japanese Patent Application No. 2007-111153 filed on Apr. 20, 2007 including specification, drawings and claims is incorporated herein by reference in its entirety.

BACKGROUND

The present invention relates to a split type seat back composing a seat for a vehicle. More particularly, the present invention relates to an attaching structure of the split type seat back including a pair of seat backs which are independently pivotably attached to a floor of the vehicle.

Figure 9:
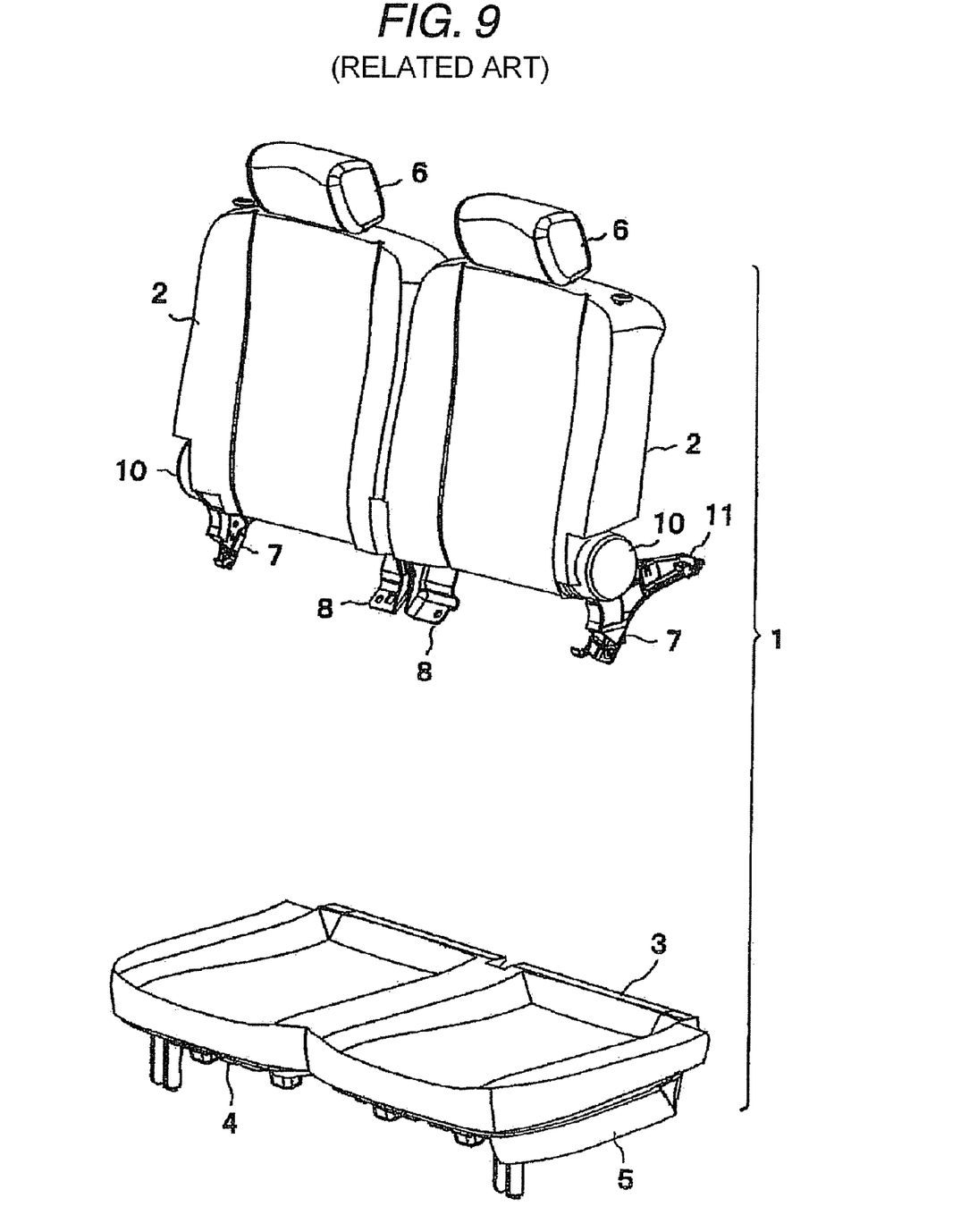
FIG. 9 is a perspective view separately showing a seat back and a seat cushion of a seat for a vehicle according to a related-art.

In the related-art seat 1 for a vehicle shown in FIG. 9, a seat back 2 for supporting the upper body of a passenger and a seat cushion 3 for supporting a hip and thighs of the passenger compose seating spaces of the passenger. In this structure, the seat back 2 and the seat cushion 3 are respectively independently fixed to a vehicle body with each other.

The seat cushion 3 described above is composed as follows. A cushion frame 4 made of material such as resin, the rigidity of which is relatively high is arranged below a cushion made of a flexible material which forms the seating space. Side covers 5 made of resin art attached to both sides of the cushion frame 4 in the vehicle width direction. Here, the cushion frame 4 protects the cushion from a floor face of the vehicle body. At the same time, the cushion frame 4 performs a function of maintaining a shape of the cushion. The side cover performs a function of preventing a passenger from directly touching an edge portion of the frame 4 or a floor face of the vehicle body.

Figure 10:
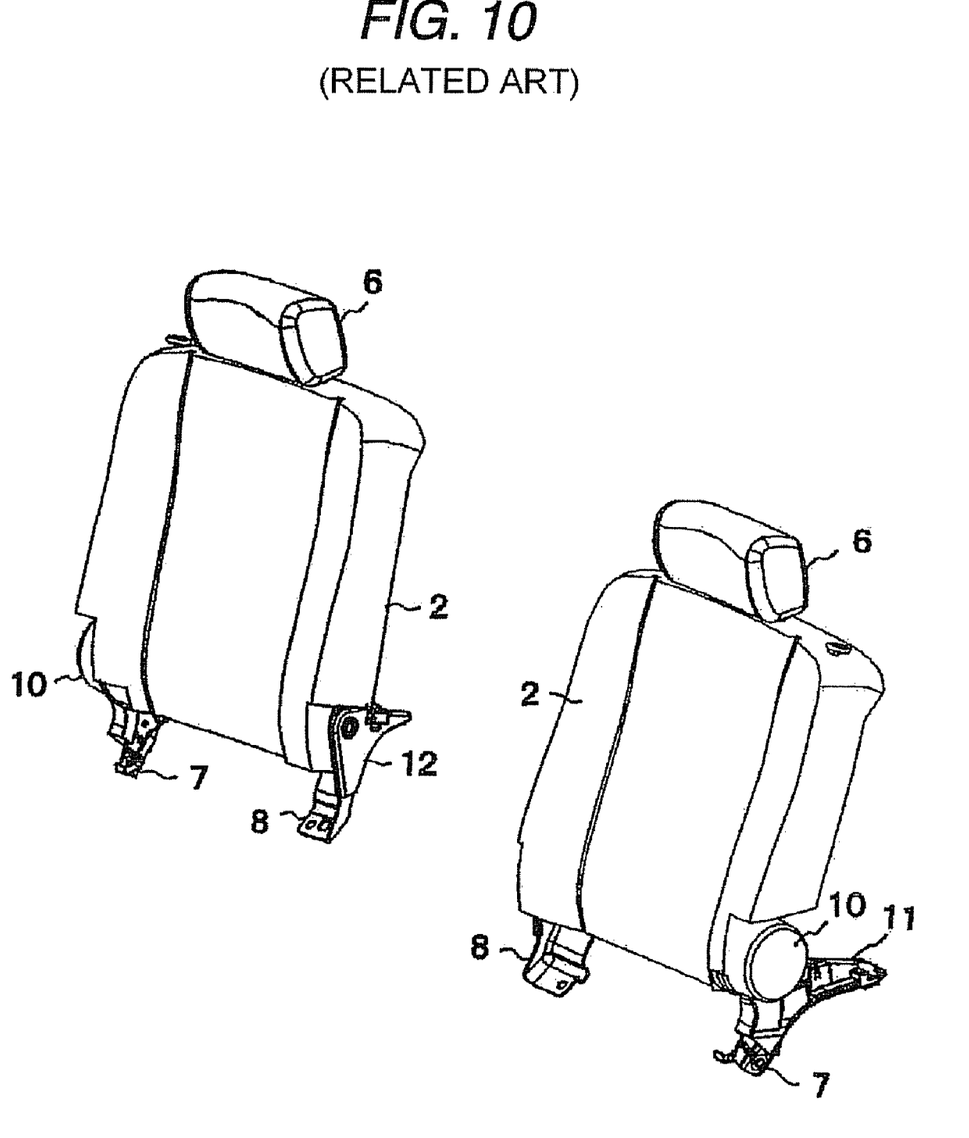
FIG. 10 is a perspective view separately showing right and left seat backs according to the related-art.
Figure 11:
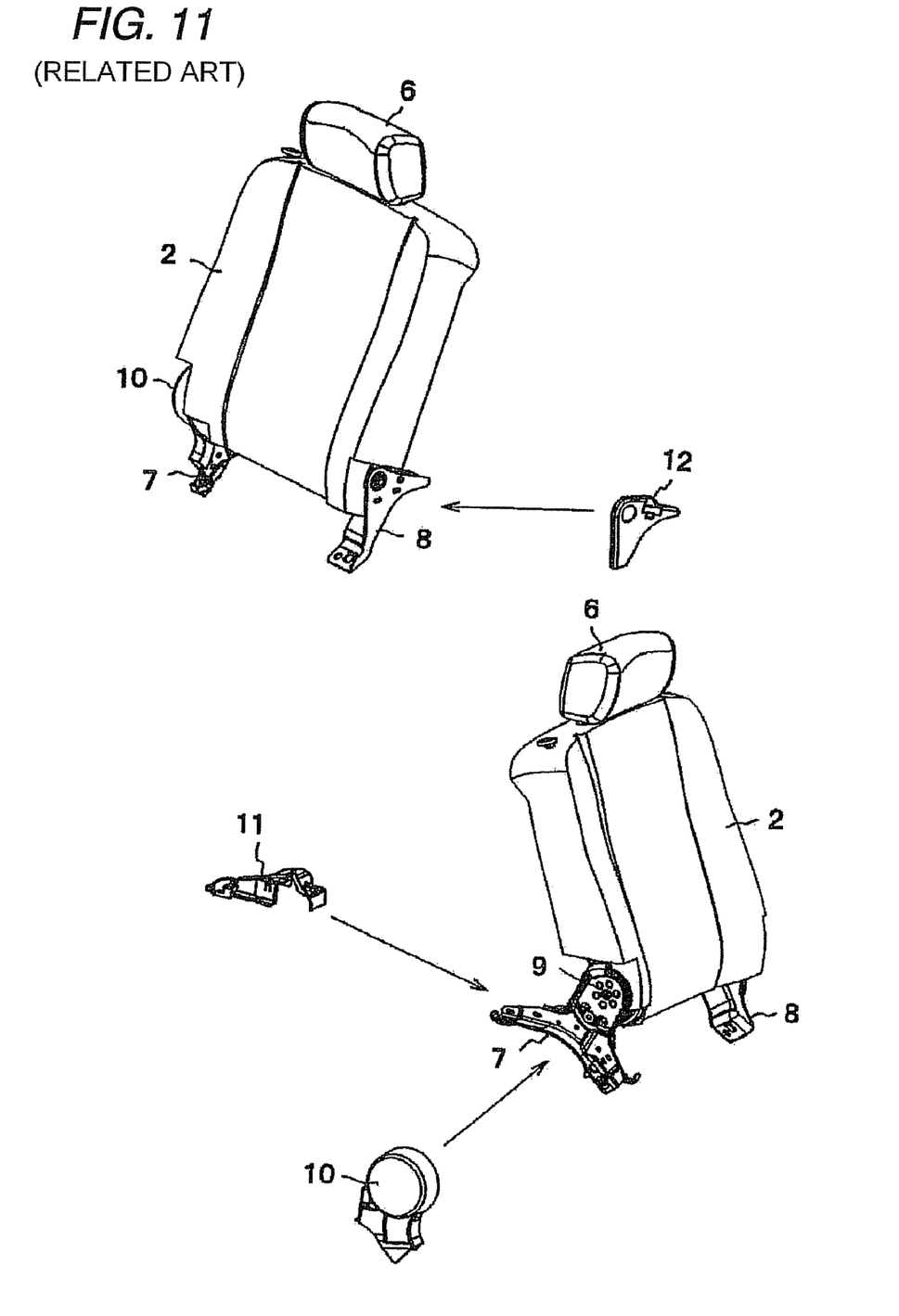
FIG. 11 is a perspective view showing a structure of attaching a cover to each seat back according to the related-art.
Figure 12:
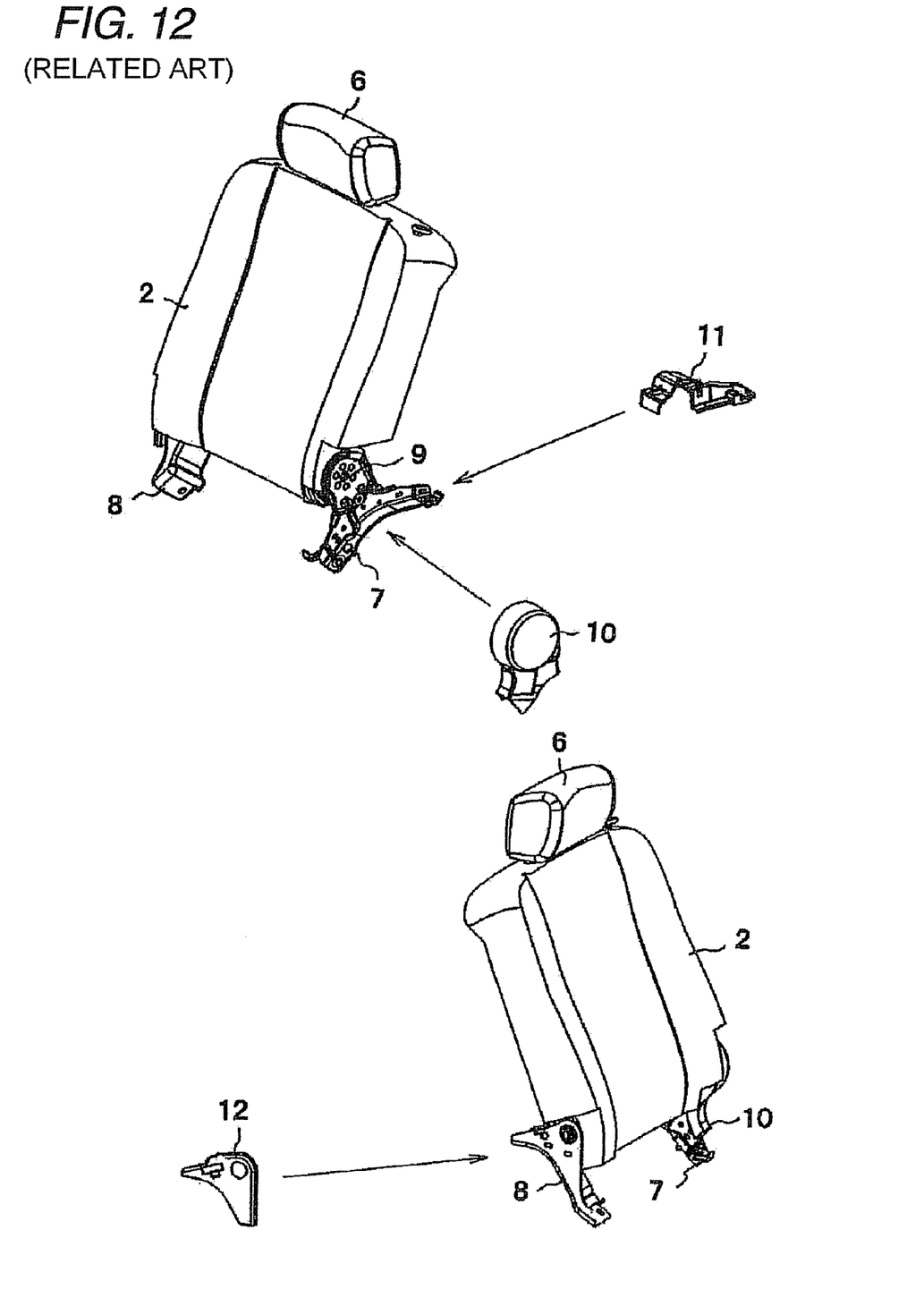
FIG. 12 is a perspective view showing the structure of attaching the cover to each seat back according to the related-art.

As shown in FIG. 10, the seat back 2 is divided into two portions and arranged in the vehicle width direction. In an upper portion of each seat back 2, the head rest 6 is arranged being capable of moving in the vertical direction. An outer lower end portion and an inner lower end portion in the vehicle width direction of each seat back 2 are pivotably attached to a floor FL by the floor bracket 7 and the center hinge bracket 8 so that the two portions of the seat back 2 can be independently moved with each other. In this case, as shown in FIGS. 11 and 12, in the floor bracket 7 which is used for attaching the outer end portion in the vehicle width direction of each seat back 2 to floor FL, the reclining mechanism 9 capable of adjusting an inclination angle of each seat back 2 is provided. Each reclining mechanism 9 is covered with the outer cover 10 made of resin. Each floor bracket 7 and center hinge bracket 8 are respectively covered with a rear cover 11 and a hinge cover 12. By the rear cover 11, the hinge cover 12 and the outer cover 10, it is possible to prevent a deterioration of the outer appearance which is caused when the floor bracket 7, the center hinge bracket 8 and the reclining mechanism 9, which are made of metal, are exposed. Further, it is possible to prevent a passenger from directly touching these components.

Figure 13:
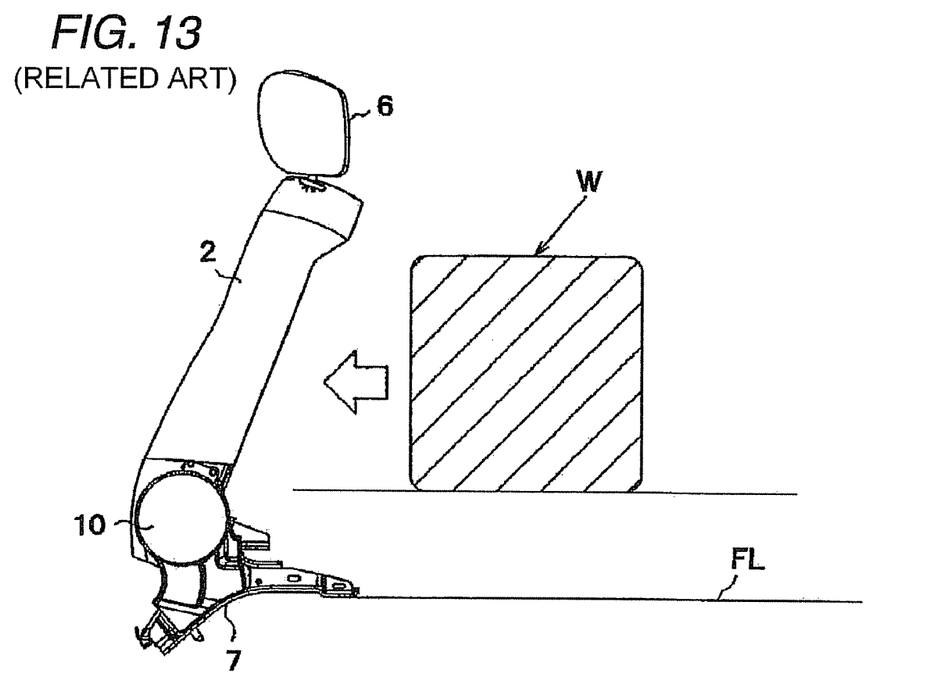
FIG. 13 is a side view showing a movement of luggage in a luggage compartment according to the related-art.
Figure 14:
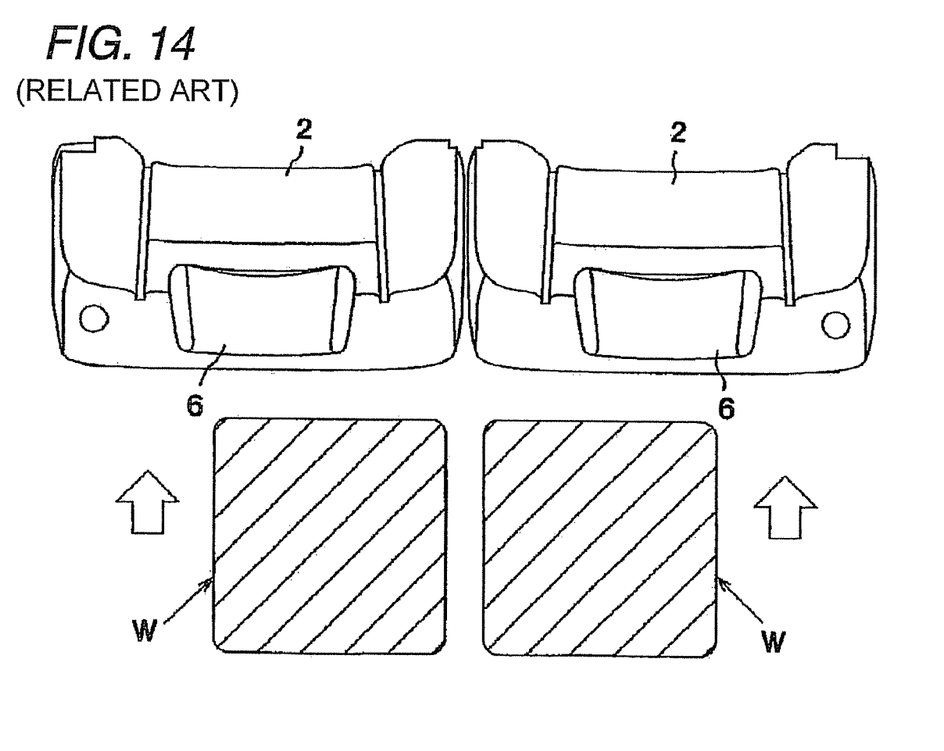
FIG. 14 is a plan view showing the movement of the luggage in the luggage compartment according to the related-art.

In this connection, in the case where the related-art seat 1 is used as a rear seat for a wagon and no bulkhead is provided between the rear seat and a luggage compartment located behind the rear seat, the following problems may be encountered. As shown in FIGS. 13 and 14, at the time of sudden braking operation, luggage W loaded in the luggage compartment is moved forward by the effect of inertia in the arrowed direction of FIGS. 13 and 14 and collides with the seat back 2. Then, an impact load is given being concentrated onto the center hinge bracket 8 by the moving luggage. Therefore, the center hinge bracket 8 is damaged. As a result, the right and the left back seats 2 are opened like a double door at a division portion.

Therefore, Patent Document 1 proposes a structure for preventing a seat back of a vehicle from being damaged by luggage. In the Patent Document 1, a seat back protection member is protruded at the rear end of the rear seat back of the vehicle in which no bulkhead is provided between the seat back and the luggage compartment.

Patent Document 1: Japanese Patent Publication No. 10-217819A

However, in the structure proposed in the Patent Document 1, the following problems may be encountered. Although a direct collision of the luggage against the seat back can be avoided by the protection member, since the seat back, which is divided to the right and the left, is directly attached to the floor by the bracket, an impact force, which is given from the luggage to the seat back through the seat back protection member acts on the bracket as it is. Therefore, the bracket is deformed and damaged. As a result, there is a possibility that the right and the left seat back are opened at the division portion.

Further, the following problem may be encountered. Since the seat back is not attached to the seat cushion but directly attached to the floor, the seat back protection member obstructs a fixation of the center hinge.

SUMMARY

It is therefore an object of the present invention to provide an attaching structure of a split type seat back for a vehicle capable of preventing the occurrence of damage of a center hinge bracket, which is caused by an impact load given to the seat back, and preventing the opening of the seat back caused by the damage of the center hinge bracket, and further capable of enhancing the assembling property of the seat back.

In order to accomplish the above objects, according to an aspect of the present invention, there is provided an attaching structure of a split type seat back for a vehicle, comprising: a pair of seat backs arranged in a vehicle width direction; a pair of floor brackets attaching outer end portions of the seat backs in the vehicle width direction to a floor of the vehicle; a pair of center hinge brackets attaching inner end portions of the seat backs in the vehicle width direction to the floor; a supporting bar separated from the floor, extended in the vehicle width direction and disposed behind the seat backs; wherein the seat backs are independently pivotably attached to the floor; wherein both end portions of the supporting bar in the vehicle width direction are attached to the floor brackets; and wherein a center portion of the supporting bar in the vehicle width direction is attached to the center hinge brackets.

With the above configuration, an impact load given to the seat backs is dispersed from the supporting bar to the right and the left directions and transmitted from the right and the left floor bracket to the floor side walls, the mechanical strength of which is relatively high. At the same time, stress can be absorbed by various components for transmitting the impact load. Accordingly, there is no possibility that the impact load is given to the center hinge brackets being concentrated. Therefore, it is possible to positively prevent the occurrence of damage of the center hinge brackets and to prevent the opening of the seat backs caused by the damage of the center hinge brackets.

Since the divided seat backs can be arranged on the floor under the condition that the divided seat backs are previously assembled to and integrated with the supporting bar, the assembling property can be enhanced and a time for assembling the seat backs on the assembling line can be greatly reduced.

The both end portions of the supporting bar may be provided with a pair of side brackets; and front and rear portions of each of the side brackets, between which the supporting bar is interposed may be fixed to the floor brackets so that the side brackets are horizontally fixed to the floor brackets.

With the above configuration, side brackets are respectively attached to both end portions of the supporting bar in the vehicle width direction, and front and rear portions of each side bracket, between which the supporting bar is interposed, are fastened so as to horizontally fix the side brackets to the floor brackets. Therefore, even in the case where the center hinge brackets are swollen upward by a load given to the seat backs and the supporting bar is pulled upward by the swell of the center hinge brackets, bolts for joining the side brackets to the floor brackets are given a force in the direction of pulling. Therefore, tensile stress is given to the bolts. Accordingly, compared with a case in which a shearing stress is given to the bolts, a fixing strength of the side brackets can be enhanced, that is, a fixing strength of fixing both end portions of the supporting bar to the floor bracket can be enhanced. Especially, since the front and rear portions of each side bracket, between which the supporting bar is interposed, are fastened so as to fix the side bracket to the floor bracket, even when the supporting bar is pulled upward by a deformation of the center portion of the supporting bar, the side bracket is not deformed in a twisting direction and the load given to the seat backs can be effectively dispersed. In this connection, in the case of a vehicle, the floor of which has an inclined face, it is possible to substantially horizontally fix the side brackets to the floor brackets.

The both end portions of the supporting bar may be separated from inside walls of the floor brackets in the vehicle width direction, thereby forming gaps between each of the both end portions and the inside walls, respectively.

With the above configuration, even when the supporting bar is given a load and deformed, the deformation does not affect the floor brackets, that is, the floor brackets can be prevented from being deformed by the load.

Rear end portions of the center hinge brackets may be separated from the floor; the center portion of the supporting bar may be provided with a center bracket; and the center bracket may be attached to the rear end portions of the center hinge brackets.

With the above configuration, a space is formed below the rear end portions of the center hinge brackets. Accordingly, the space can be effectively used as an accommodation space for a spare tire.

The supporting bar may be provided with a board fixing bracket disposed in the vicinity of the center bracket.

With the above configuration, a board for covering an upper face of the accommodation recess portion formed on the floor can be stably supported by the board fixing bracket. Accordingly, it is possible to solve such a problem that the board is shifted in a vehicle length direction by the weight of the luggage moving on an upper face of the board.

BRIEF DESCRIPTION OF THE DRAWINGS

The above objects and advantages of the present invention will become more apparent by describing in detail preferred exemplary embodiments thereof with reference to the accompanying drawings, wherein:

FIG. 7 is a side view showing a board fixing supporting structure for supporting a board by a fixing bracket, that is, FIG. 7 is a side view in which one of seat backs is taken from a dividing portion side;

DETAILED DESCRIPTION OF THE EMBODIMENTS

Referring to the accompanying drawings, an embodiment of the present invention will be explained below.

Between FIGS. 1 to 8 and FIGS. 9 to 14, the same reference numerals are used to indicate the same components. Duplicate explanations of the same components are omitted here.

Figure 5:
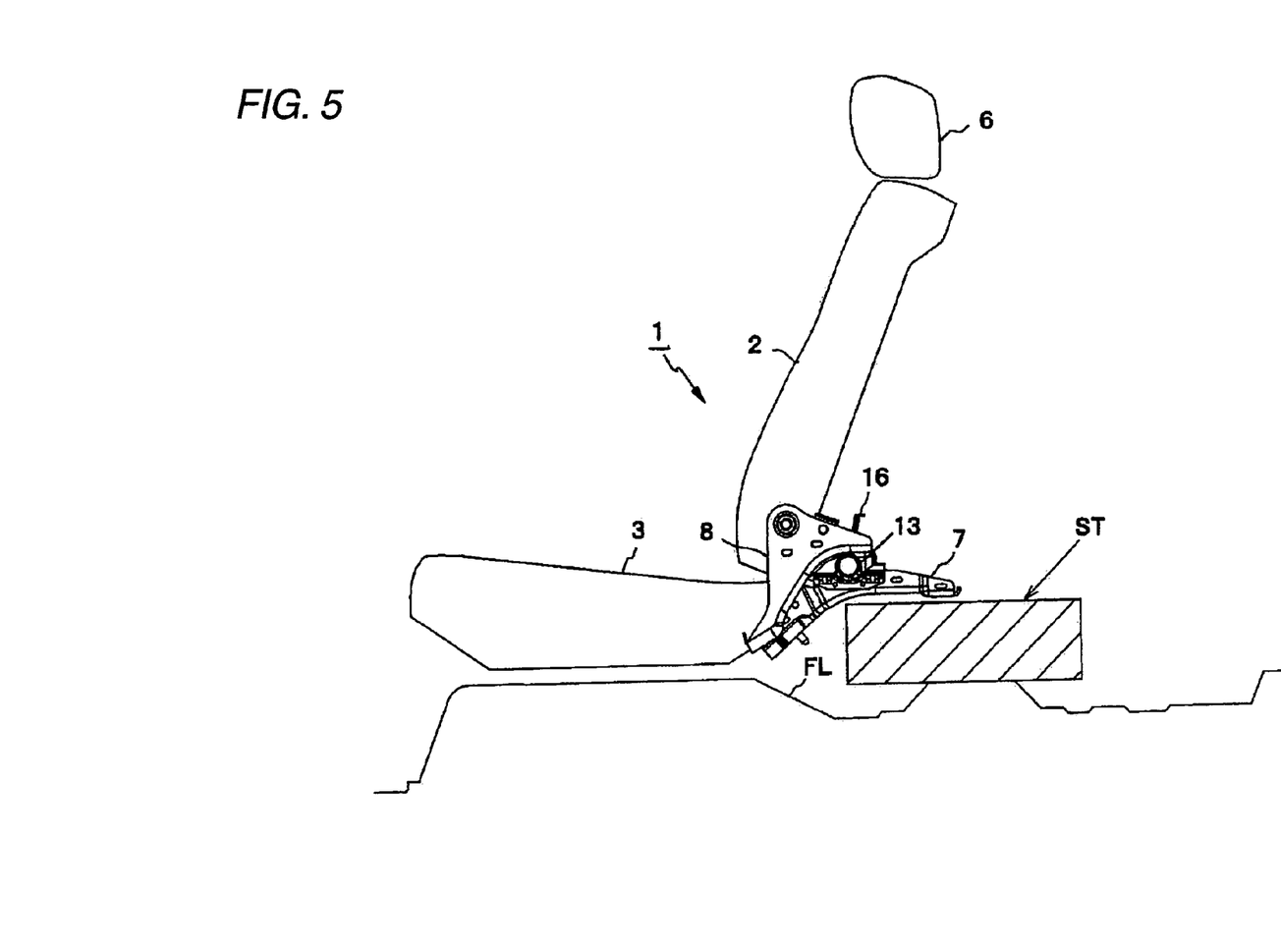
FIG. 5 is a side view of one of the seat backs according to the embodiment, wherein the view is taken from a dividing portion side.

The seat 1 for a vehicle of the present embodiment is a rear seat of a wagon. Between the rear seat 1 and a luggage compartment located behind the rear seat 1, no bulkhead is provided. As shown in FIG. 5, the split type seat back 2 and the seat cushion 3, which compose the rear seat 1, are respectively, independently attached to floor FL.

On the luggage compartment side (the lower side of FIG. 1) behind the seat back 2, the supporting bar 13 is extended in the vehicle width direction under the condition that the supporting bar 13 is separated from floor FL. Both end portions of the supporting bar 13 in the vehicle width direction are attached to the floor brackets 7 and a portion of the center hinge bracket 8, that is, a rear end portion of the center hinge bracket 8 is attached to a center portion in the width direction of the supporting bar 13.

Figure 1:
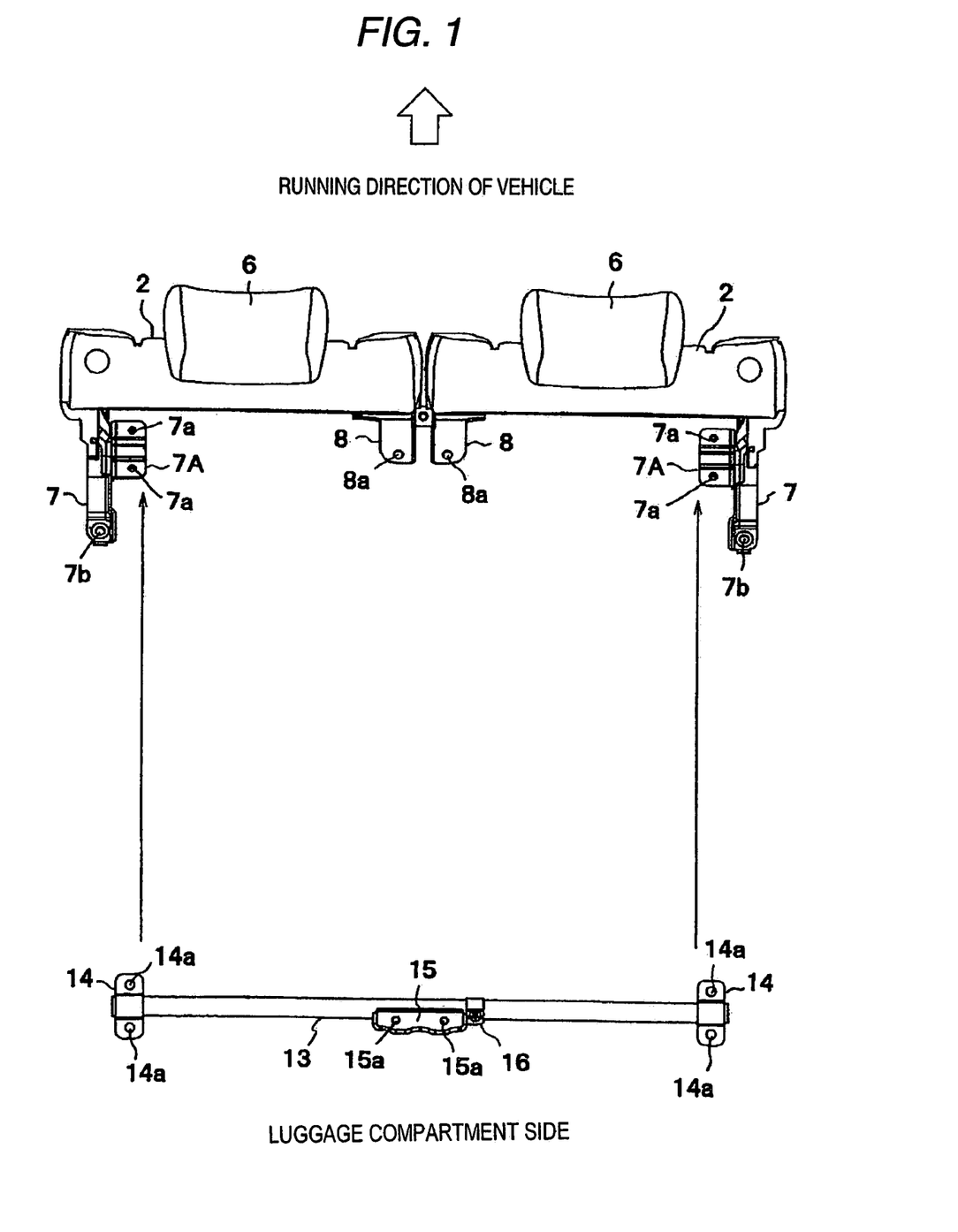
FIG. 1 is a plan view showing an assembling procedure for assembling a supporting bar to seat backs according to an embodiment of the present invention.

The supporting bar 13 is formed out of a pipe member, the cross section of which is formed circular. As shown in FIG. 1, in both end portions in the longitudinal direction of the supporting bar 13, the rectangular-plate-shaped side brackets 14 are attached. In a center portion in the longitudinal direction of the supporting bar 13, the center bracket 15, which is long in the vehicle width direction, is attached. Further, in the periphery of this center bracket 15, the board fixing bracket 16 is attached. In this case, each side bracket 14 is extended in the longitudinal direction while the supporting bar 13 is being interposed between a front portion and a rear portion of each side bracket 14. At the front end portion and the rear end portion of each side bracket 14, the circular holes 14a are formed. In the center bracket 15, two circular holes 15a are formed and arranged in the vehicle width direction.

Figure 2:
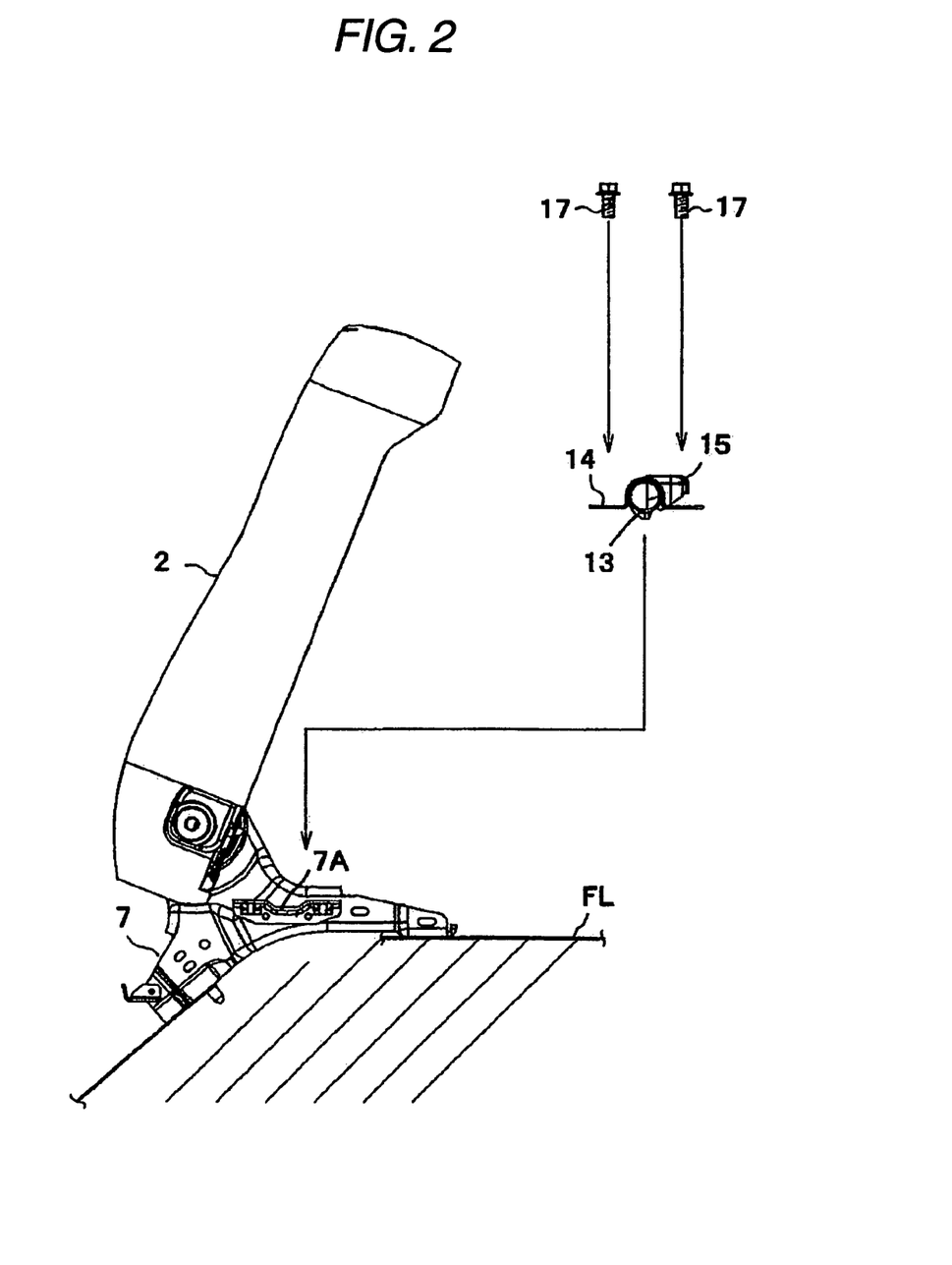
FIG. 2 is a side view showing the assembling procedure for assembling the supporting bar to the seat backs according to the embodiment.

On the other hand, as shown in FIG. 2, the floor bracket 7 for pivotably supporting each seat back 2 is formed into a C-shape in the side view so that the floor bracket 7 can be laid on a flat face and an inclined face of floor FL. On an inner wall rising vertically, the floor side bracket 7A, the shape of which is a rectangular-plate-shape, is protruded in the horizontal direction. In the front and at the rear of this floor side bracket 7A, the circular holes 7a are formed. In this connection, in the front and at the rear of the floor bracket 7, the circular hole 7b (Only the rear side of the circular hole 7b is shown in FIG. 1.) is formed. This floor bracket 7 is attached to floor FL by bolts not shown, which are inserted into the circular holes 7b, as shown in FIG. 2. Here, the floor side bracket 7A maintains horizontal attitude.

In the front end portion and at the rear end portion of the center hinge bracket 8 located at the dividing portion of the seat back 2, the circular holes 8a (Only the rear side circular holes 8a are shown in the drawing.) are formed. The center hinge bracket 8 is attached to floor FL by bolts not shown which are inserted into circular holes formed on the front side of the center hinge bracket 8.

Figure 3:
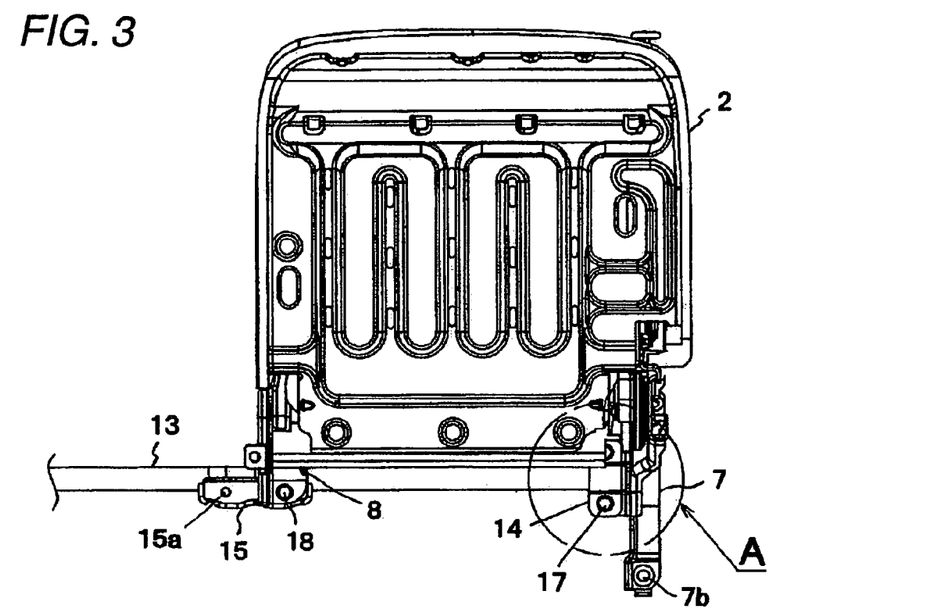
FIG. 3 is a partial plan view showing the assembling procedure for assembling the supporting bar to the seat backs according to the embodiment.
Figure 4:
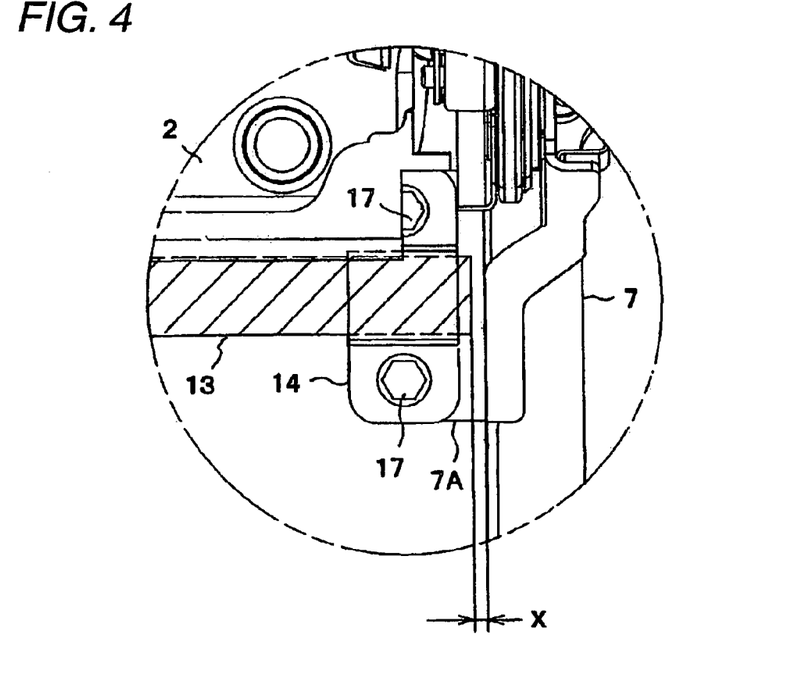
FIG. 4 is an enlarged view showing portion A of FIG. 3.

Concerning the supporting bar 13, as shown by the arrows in FIGS. 1 and 2, the side brackets 14, which are attached to both end portions in the longitudinal direction of the supporting bar 13, are put on the horizontal floor side brackets 7A of the right and the left floor bracket 7 from an upper portion and the bolts 17, which are inserted into the circular holes 7a, 14a respectively formed in the floor side brackets 7A, are fastened. Due to the foregoing, both end portions in the longitudinal direction of the supporting bar 13 are attached to the right and the left floor bracket 7. At this time, as shown in FIG. 4, both end portions in the longitudinal direction of the supporting bar 13 are arranged being separate from the inside walls of the floor bracket 7 and a gap x shown in the drawing is formed between them. In this connection, considering the workability, this supporting bar 13 is attached under the condition that the seat backs 2 are horizontally laid down as shown in FIG. 3.

The center hinge bracket 15, which is attached to the center portion of the supporting bar 13, is put on both center hinge brackets 8 so that the circular holes 16a, 8a formed on both of them can be made to agree with each other. Both center hinge brackets 8 and the center bracket 15 are fastened to each other by the bolts 18 (shown in FIG. 3) inserted into the circular holes 8a, 15a. Accordingly, a front end portion of each center hinge bracket 8 is fixed to floor FL as described before and a rear end portion is attached to the supporting bar 13.

Figure 7:
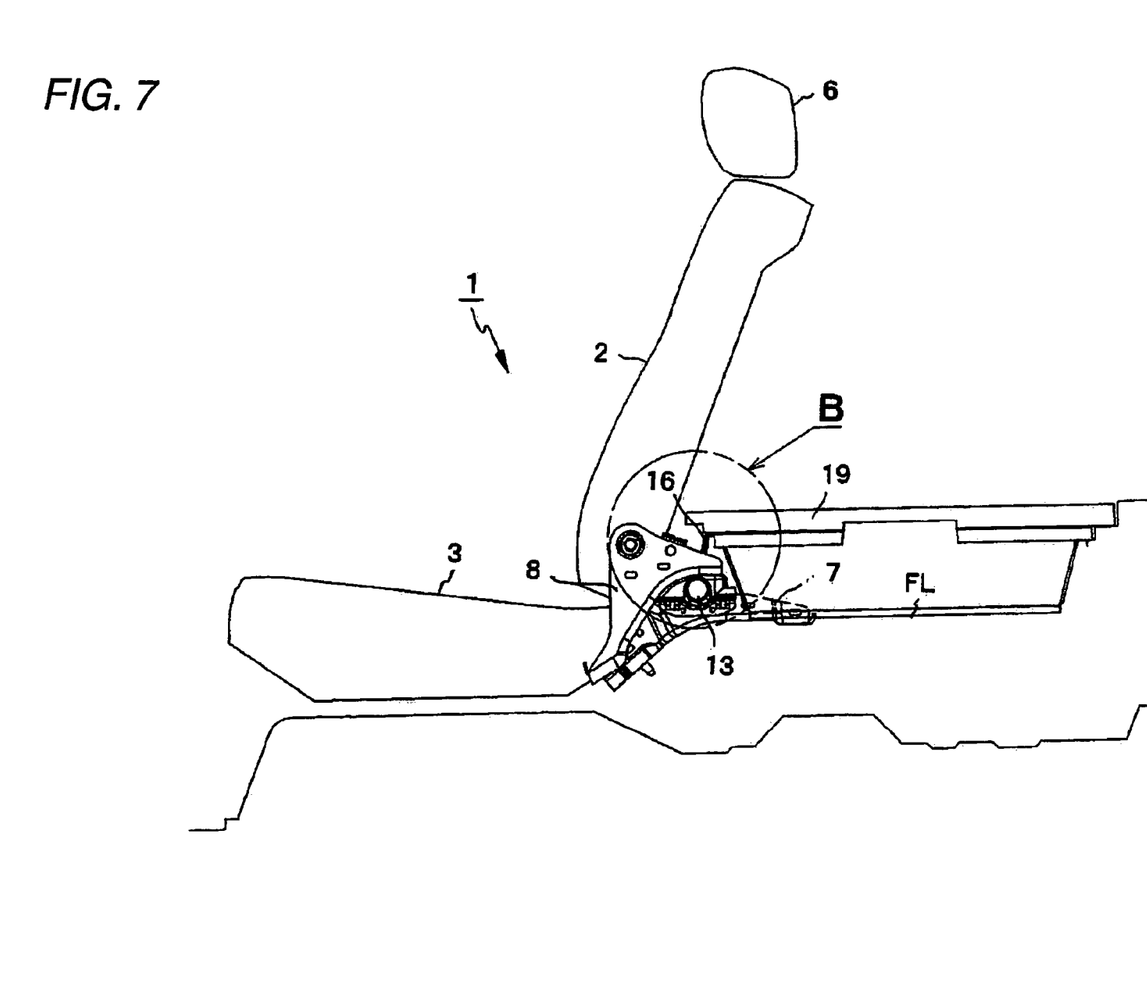
Figure 8:
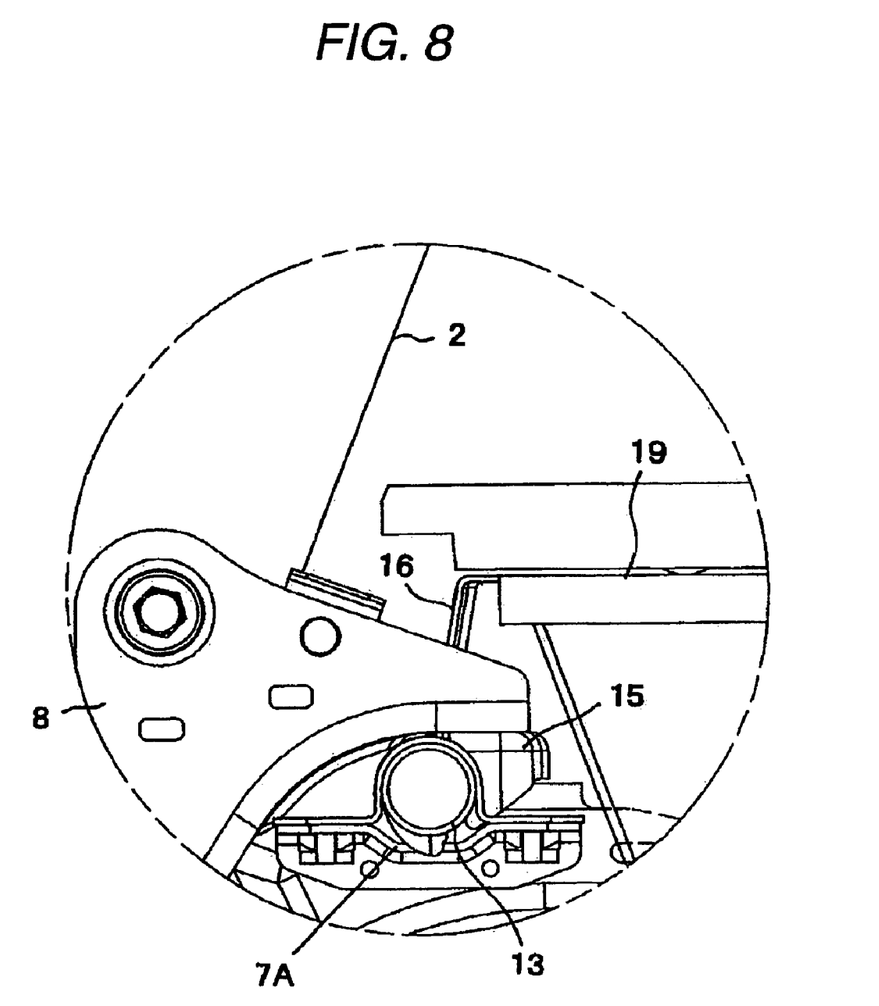
FIG. 8 is an enlarged view of portion B of FIG. 7.

As described above, the supporting bar 13 is extended in the vehicle width direction on the luggage compartment side (on the lower side in FIG. 1) under the condition that the supporting bar 13 is separated from the floor FL. Both end portions of the supporting bar 13 in the vehicle width direction are attached to the floor brackets 7. The rear end portion of each center hinge bracket 8 is attached to the center portion in the width direction of the supporting bar 13. At this time, the board fixing bracket 16, which is attached to the periphery of the center bracket 15 of the supporting bar 13, fixes and supports a front end portion of the board 19 for covering an upper face of the accommodation recess portion formed on floor FL as shown in FIGS. 7 and 8.

Figure 6:
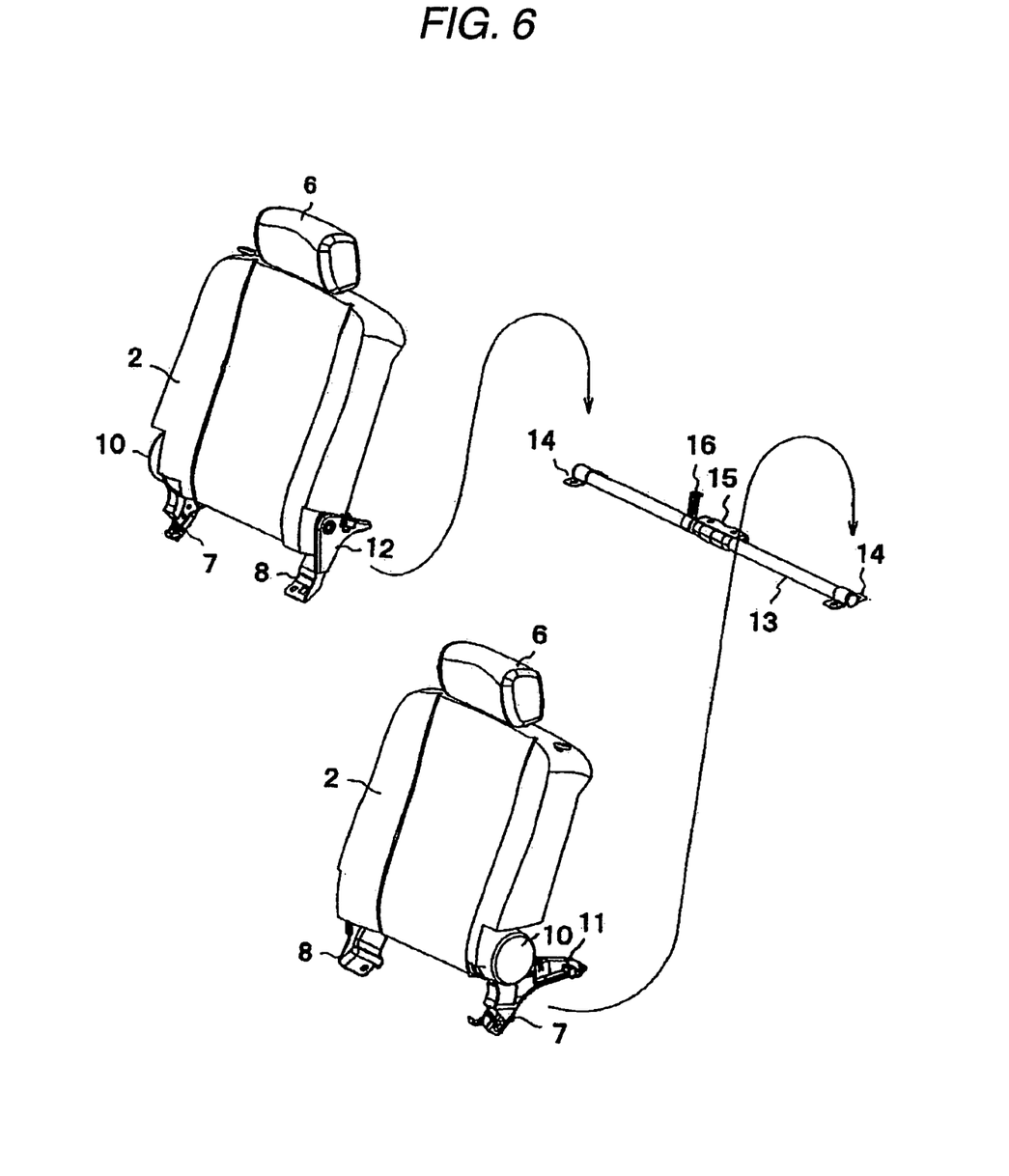
FIG. 6 is an exploded perspective view showing an assembling procedure for assembling a seat back to a floor according to the embodiment.

In this connection, as shown in FIG. 6, at the time of assembling the seat back 2 to floor FL, under the condition that the divided seat backs 2 are previously assembled to and integrated with the supporting bar 13, the divided seat backs 2 are arranged on floor FL. Due to this procedure, the assembling property of the seat back 2 can be enhanced and the assembling time of the seat backs on the assembling line can be greatly reduced. In this connection, at the time of assembling the seat backs 2, a reclining mechanism not shown provided in each floor bracket 7 is covered with the outer cover 10. Further, each floor bracket 7 and center hinge bracket 8 are respectively covered with the rear cover 11 and the hinge cover 12.

In the present embodiment, the supporting bar 13 is extended in the vehicle width direction on the luggage compartment side (on the lower side of FIG. 1) behind the seat back 2 under the condition that the supporting bar 13 is separated from the floor FL and both end portions of the supporting bar 13 in the vehicle width direction are attached to the floor brackets 7. Further, the rear end portion of the center hinge bracket 8 is attached to the center portion in the width direction of the supporting bar 13. Due to the above structure, even when the luggage in the luggage compartment is going to move forward by the effect of inertia of the luggage in the luggage compartment at the time of sudden braking operation, an impact load given to the seat back 2 is dispersed from the supporting bar 13 to the right and the left and transmitted from the right and the left floor bracket 7 to the side walls of floor FL, the mechanical strength of which is high. Further, by various components for transmitting the impact load, stress is absorbed. Accordingly, there is no possibility that the impact load is given to the center hinge bracket 8 being concentrated. Therefore, the damage of the center hinge bracket 8 and the opening of the seat back 2, which is caused by the damage of the center hinge bracket 8, can be positively prevented.

In the present embodiment, the side brackets 14 are respectively attached to the both end portions of the supporting bar 13, and the front and the rear portion of each side bracket 14, between which the supporting bar 13 is interposed, are fastened so as to horizontally fix the side bracket 14 to the floor side bracket 7A of the floor bracket 7. Therefore, even in the case where the center hinge bracket 8 is swollen upward by a load given to the back seat 2 and the supporting bar 13 is pulled upward by the swell of the center hinge bracket 8, bolts 17 for joining the side bracket 14 to the floor bracket 7 is given a force in the direction of pulling. Therefore, tensile stress is given to the bolts 17. Accordingly, compared with a case in which shearing stress is given to the bolts 17, a fixing strength of the side bracket 14 can be enhanced, that is, a fixing strength of fixing both end portions in the longitudinal direction of the supporting bar 13 to the floor bracket 7 can be enhanced. Especially, since a front and a rear portion of each side bracket 14, between which the supporting bar 13 is interposed, are fastened so as to fix the side bracket 14 to the floor bracket 7, even when the supporting bar 13 is pulled upward by a deformation of the center portion of in the longitudinal direction of the supporting bar 13, the side bracket 14 is not deformed in a twisting direction and a load given to the seat back 2 can be effectively dispersed.

In the present embodiment, both end portions in the longitudinal direction of the supporting bar 13 are arranged being separate from inside walls of the floor bracket 7 by a predetermined distance and a gap x (shown in FIG. 4) is formed between both of them. Therefore, even when the supporting bar 13 is given a load and deformed, the deformation does not affect the floor bracket 7. Therefore, there is no possibility that the stability of operation of the reclining mechanism provided in the floor bracket 7 is lowered.

In the present embodiment, as shown in FIG. 5, a rear end portion of each center hinge bracket 8 is separated from floor FL and attached to an intermediate portion in the longitudinal direction of the supporting bar 13. Therefore, a space is formed in the lower portion. Accordingly, this space can be effectively used as an accommodation space for accommodating spare tire ST.

In the present embodiment, the board fixing bracket 16 is arranged in the periphery of the center bracket 15 of the supporting bar 13, that is, a board fixing bracket 16 is arranged in a center portion in the vehicle width direction. Therefore, as shown in FIGS. 7 and 8, the board 19 for covering an upper face of the accommodation recess portion formed on floor FL can be stably supported by the board fixing bracket 16 in vehicle width direction. For example, it is possible to solve such a problem that the board is shifted in the longitudinal direction of the vehicle by the weight of the luggage moving on an upper face of the board 19.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An attaching structure for attaching a split type seat back for a vehicle to a floor of the vehicle, comprising:
   a pair of seat backs arranged in a vehicle width direction;
   a pair of floor brackets attached to outer end portions of the seat backs in the vehicle width direction and configured to be attached to the floor;
   a pair of center hinge brackets directly attached to inner end portions of the seat backs in the vehicle width direction and configured to be attached to the floor;
   a supporting bar separated from the floor, extended in the vehicle width direction and disposed behind the seat backs;
   wherein the seat backs are independently pivotably attached to the floor brackets and the center hinge brackets with respect to the floor;
   wherein both end portions of the supporting bar in the vehicle width direction are attached to the floor brackets; and
   wherein a center portion of the supporting bar in the vehicle width direction is directly attached to the center hinge brackets.

2. The attaching structure as set forth in claim 1,
   wherein the both end portions of the supporting bar are provided with a pair of side brackets;
   wherein front and rear portions of each of the side brackets, between which the supporting bar is interposed are fixed to the floor brackets so that the side brackets are horizontally fixed to the floor brackets.

3. The attaching structure as set forth in claim 1, wherein the both end portions of the supporting bar are separated from inside walls of the floor brackets in the vehicle width direction, thereby forming gaps between each of the both end portions and the inside walls, respectively.

4. The attaching structure as set forth in claim 1 wherein rear end portions of the center hinge brackets are separated from the floor;
   wherein the center portion of the supporting bar is provided with a center bracket; and
   wherein the center bracket is attached to the rear end portions of the center hinge brackets.

5. An attaching structure of a split type seat back for a vehicle, comprising;
   a pair of seat backs arranged in a vehicle width direction;
   a pair of floor brackets attaching outer end portions of the seat backs in the vehicle width direction to a floor of the vehicle;
   a pair of center hinge brackets attaching inner end portions of the seat backs in the vehicle width direction to the floor;
   a supporting bar separated from the floor, extended in the vehicle width direction and disposed behind the seat backs;
   wherein the seat backs are independently pivotably attached to the floor;
   wherein both end portions of the supporting bar in the vehicle width direction are attached to the floor brackets;
   wherein a center portion of the supporting bar in the vehicle width direction is attached to the center hinge brackets;
   wherein rear end portions of the center hinge brackets are separated from the floor;
   wherein the center portion of the supporting bar is provided with a center bracket;
   wherein the center bracket is attached to the rear end portions of the center hinge brackets; and
   wherein the supporting bar is provided with a board fixing bracket disposed in the vicinity of the center bracket.

* * * * *